United States Patent Office 2,751,786
Patented June 26, 1956

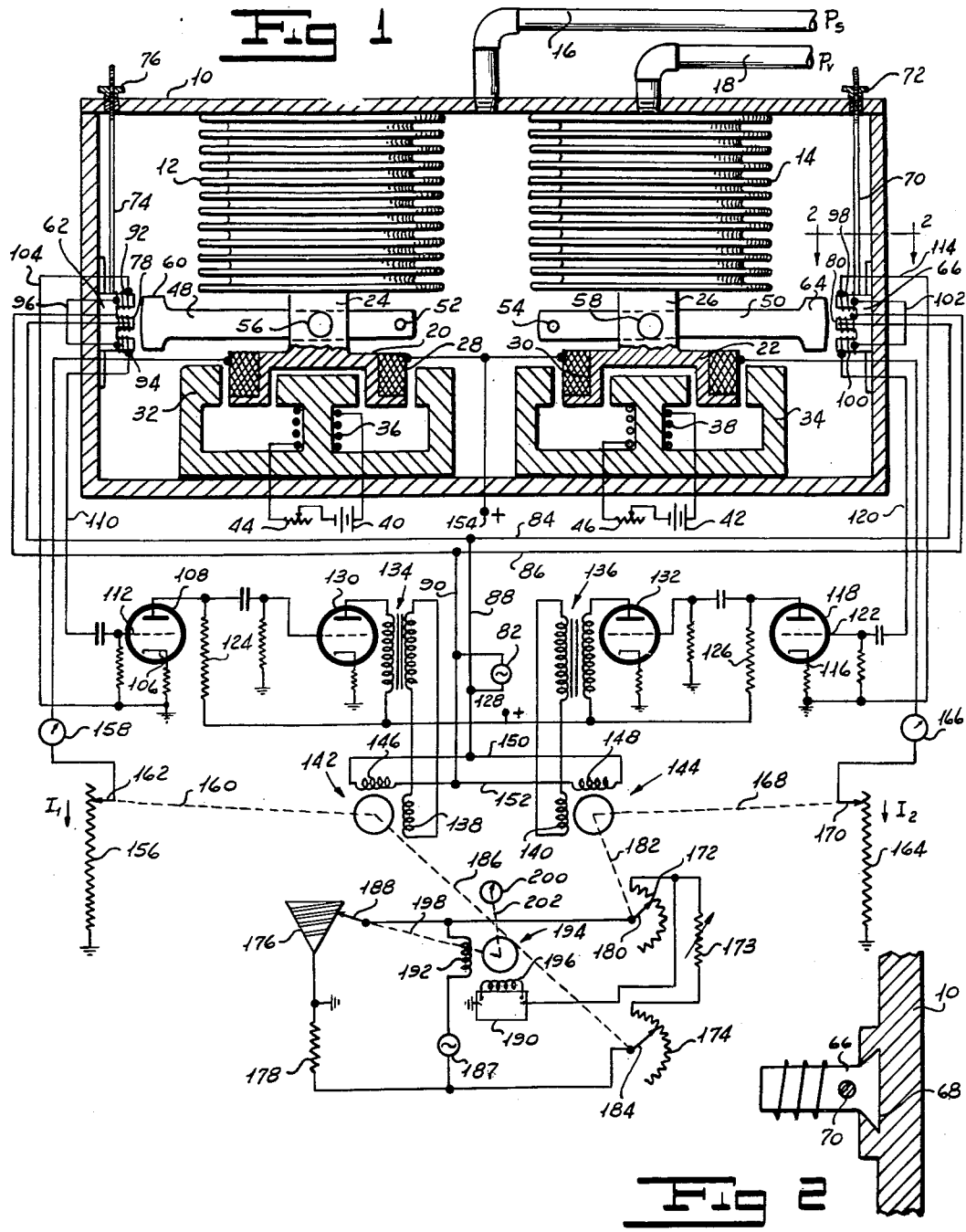
June 26, 1956    W. C. COULBOURN ET AL    2,751,786
TRUE AIR SPEED METER
Filed April 14, 1953    2 Sheets-Sheet 1
INVENTORS
WILLIAM C. COULBOURN
HERBERT J. SANDBERG
BY
*Henry L. Shenier*
ATTORNEY

2,751,786

TRUE AIR SPEED METER

William C. Coulbourn, Roslyn Heights, and Herbert J. Sandberg, New York, N. Y., assignors, by mesne assignments, to Norden Ketay Corporation, a corporation of Illinois Application April 14, 1953, Serial No. 348,794

9 Claims. (Cl. 73—182)

Our invention relates to an improvement in true air speed meters and more particularly to a device capable of ascertaining the true speed of an aircraft relative to the air through which it is passing, with great accuracy and precision.

In order to obtain a measurement of the true air speed of an aircraft, as will be shown hereinafter, some means must be provided for comparing the static pressure of the circumambient air with the difference between Pitot pressure and static pressure. Patent No. 2,599,288 discloses a mechanical system for obtaining this comparison including a pair of bellows, one of which is responsive to static pressure and the other to Pitot pressure. The forces exerted by the pressures on the bellows are balanced by a system of levers, the position of the balance point of which is a function of the ratio of the difference between Pitot pressure and static pressure with respect to static pressure itself. Means are provided for varying the resistance of two of the arms of a bridge proportionally to the displacement of the balance point. The bridge also contains a temperature-responsive element against which the two arms are balanced to give an indication of true air speed. This system, however, suffers from a number of disadvantages. It is a mechanical balance system subject to friction and is expensive to manufacture. Moreover, since the comparison is obtained mechanically, the inaccuracy inherent in all mechanical systems may affect the result obtained. We have provided an improved system in which the effect of the nonlinear characteristic is minimized and in which the comparison is obtained electrically so that the inaccuracy of the mechanical system is substantially overcome.

One object of our invention is to provide a true air speed meter having high accuracy and precision.

Another object of our invention is to provide a system wherein two pressures may be compared with a high degree of accuracy.

Another object of our invention is to provide an improved air speed meter in which the static pressure and the difference between Pitot pressure and static pressure are balanced against the electromagnetic pulls of windings disposed in magnetic fields and in which indications of the amounts of the pressures are electrically compared with one another and with a temperature measurement to give an indication of true air speed.

Another object of our invention is to provide an improved true air speed meter in which the pressure-sensing elements are operated about nulls so that great accuracy and precision is achieved.

Other and further objects of our invention will appear from the following description.

In general our invention contemplates the provision of a pair of bellows, one responsive to static pressure and the other responsive to the difference between Pitot pressure and static pressure. These bellows are mounted in a common housing, and the forces exerted on the bellows by the pressures are balanced by the electromagnetic pulls of a pair of windings, each of which is carried by one of the bellows. The windings are disposed in magnetic fields, and as the forces exerted on the bellows by the pressures vary, the currents through the respective coils are adjusted to balance the pulls. We compare the currents required to balance the pulls to obtain a measure of the ratio of the pressures. A Wheatstone bridge having a balancing arm and a temperature-responsive element balances the resistance ratio of the balancing arm and the temperature-responsive element against a ratio which is a function of the ratio of the pressure on the second and first bellows, respectively, to give an indication of true air speed. The system is arranged so that the means for adjusting the coil currents operate about nulls and the effect of the nonlinearity resulting from the bellows or the electromagnetic system or other causes and all of these is overcome.

In the accompanying drawings which form part of the instant specification and which are to be read in conjunction therewith and in which like reference numerals are used to indicate like parts in the various views:

Figure 1 is a diagrammatic view of a true air speed meter showing one embodiment of our invention.

Figure 2 is a sectional view drawn on an enlarged scale and taken along the line 2—2 of Figure 1.

Figure 3:
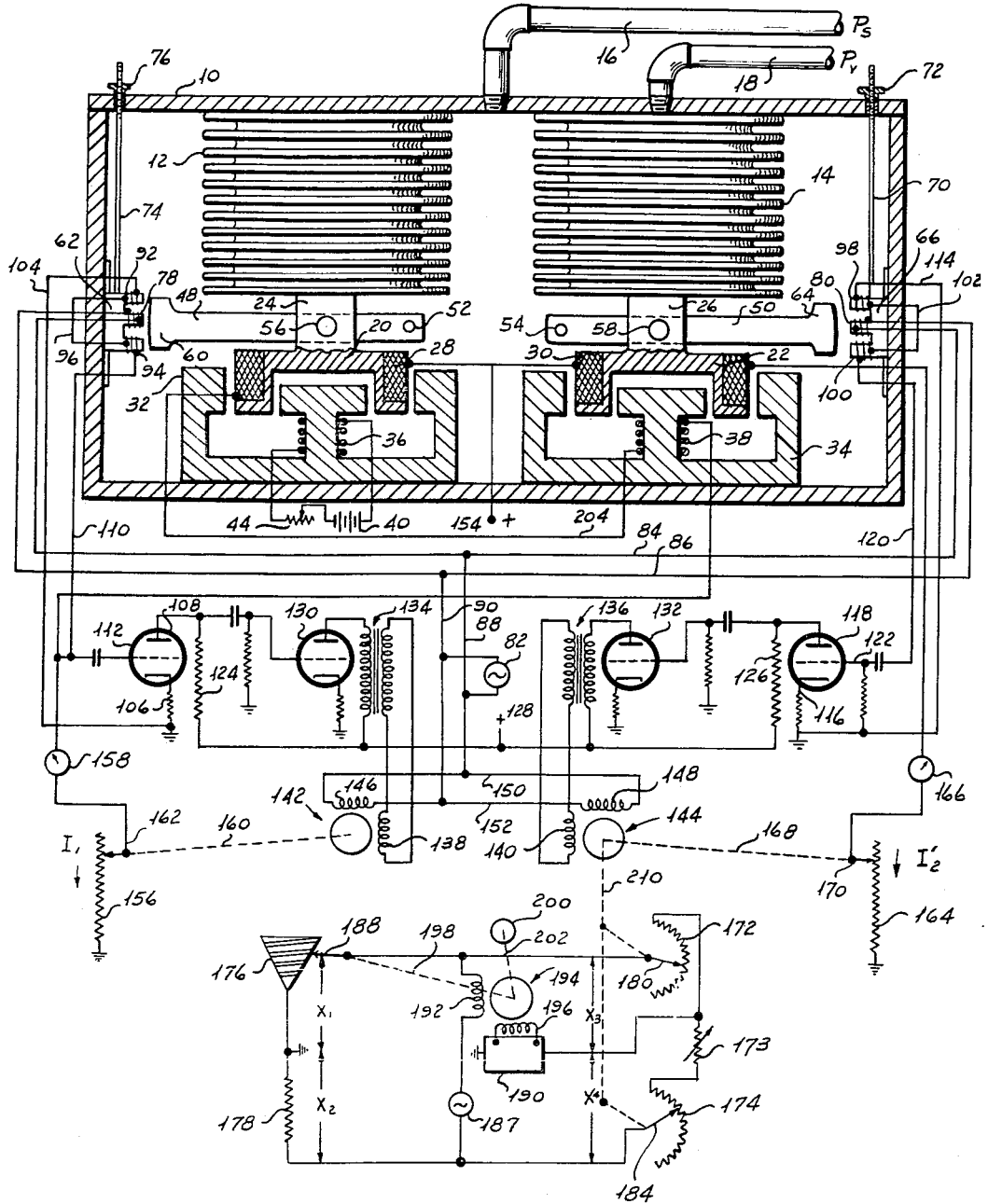
Figure 3 is a diagrammatic view of a modified form of our invention.

Let:

$P_V$ = pressure in the Pitot tube
$P_S$ = static pressure
$T_0$ = free air temperature
$T$ = temperature of air brought to rest with respect to the aircraft
$\gamma$ = ratio of specific heat of air at constant pressure to specific heat of air at constant volume
$a$ = speed of sound
$V$ = true air speed
$R$ = gas constant.

Now for true air speeds less than the speed of sound, the relations existing between pressures, temperatures and speeds may be expressed as follows:

(1)
$$\frac{P_V}{P_S} = \left(1 + \frac{\gamma-1}{2} \cdot \frac{V^2}{a^2}\right)^{\frac{\gamma}{\gamma-1}}$$

(2)
$$\frac{T}{T_0} = \left(1 + \frac{\gamma-1}{2} \cdot \frac{V^2}{a^2}\right)$$

(3)
$$a^2 = \gamma R T_0$$

More particularly, referring now to the embodiment of our invention shown in Figure 1, we provide an enclosed housing or chamber 10 in which are mounted a pair of bellows 12 and 14. Advantageously, bellows 12 is partially evacuated. A pipe 16 communicates with the interior of housing 10 and the circumambient air so that bellows 12 is responsive to static pressure. A second pipe 18 connects the interior of bellows 14 to a source of Pitot dynamic pressure such as a Pitot tube (not shown) so that bellows 14 is responsive to the difference between static pressure (the pressure within the housing) and Pitot dynamic pressure. On the bases of bellows 12 and 14 we mount nonmagnetic supports 20 and 22 by means of brackets 24 and 26. The supports 20 and 22 carry windings 28 and 30 which are placed in the fields of electromagnets 32 and 34 supported on the base of housing 10. Magnets 32 and 34 may be permanent magnets if we desire, but preferably they are electromagnets which we energize by windings 36 and 38 supplied with current from batteries 40 and 42 flowing through variable resistors 44 and 46.

We pivotally mount armatures 48 and 50 on the chamber wall around pins 52 and 54, carried by the housing, and attach them to brackets 24 and 26, respectively, by pins 56 and 58, so that the end 60 of armature 48 is positioned adjacent a sensing means such as an E-transformer or the like 62, and the end 64 of armature 50 is positioned adjacent a similar sensing means such as an E-transformer or the like 66. E-transformer 66 is slidably mounted in a slot 68 in the side of housing 10 as shown in Figure 2. To adjust the position of the E-transformer, we rotatably mount a shaft or rod 70 in transformer 66 so that the rod extends upwardly through appropriate sealing means in the top of the housing. The upper end of the shaft or rod is threaded and carries a nut 72 which bears on the top of the housing. The position of E-transformer 66 may be varied to zero the system with which it is associated by turning nut 72 to slide the transformer up or down in its slot 68. Similarly, we mount E-transformer 62 in a slot in the other side of the housing 10 and provide it with a shaft or rod 74 rotatably mounted in E-transformer 62 and which has a nut 76 on its upper threaded end. Nut 76 bears on the top of housing 10 and provides a means to zero this system.

We excite the center pole windings 78 and 80 of E-transformers 62 and 66, respectively, by means of an alternator 82 across lines 84 and 86 connecting windings 78 and 80 in parallel. Conductors 88 and 90 connect alternator 82 to the lines 84 and 86. The upper and lower pole windings 92 and 94 of E-transformer 62 are oppositely wound and connected in series by a conductor 96. Since these windings are oppositely wound, the voltages induced therein will be 180 degrees out of phase and serially added by connection 96. The upper and lower pole windings 98 and 100 of E-transformer 66 are also oppositely wound and connected in series by a conductor 102 so that they produce voltages 180 degrees out of phase and added. Any resultant difference between the voltages induced in windings 92 and 94 appears between a conductor 104, connected to the cathode 106 of a thermionic tube 108, and a conductor 110, connected to the grid 112 of tube 108. Likewise, the difference between the voltages induced in windings 98 and 100 of E-transformer 66 appears between a conductor 114 connected to the cathode 116 of a thermionic tube 118. That is, we impress the resultant differences between the voltages induced in the upper and lower windings of each of E-transformers 62 and 66 on the grids of amplifier tubes 108 and 118, respectively. The plates of tubes 108 and 118 are connected through resistors 124 and 126, respectively, to a source of positive potential 128. The outputs of tubes 108 and 118 are impressed on the grids of amplifier tubes 130 and 132, respectively, the plates of which are connected to source 128 through the primary windings of transformers indicated generally by 134 and 136. The outputs of tubes 130 and 132 are impressed across the primary windings of transformers 134 and 136, respectively, and the transformer outputs are applied, respectively, to windings 138 and 140 of two-phase motors, indicated generally by the reference numerals 142 and 144. The other windings 146 and 148 of both of the motors 142 and 144 are energized by alternator 82, across conductors 88 and 90, through conductors 150 and 152. We choose the parameters of the circuits between conductors 104 and 110 and winding 138 and between conductors 114 and 120 and winding 140 such that the voltages across the windings are ninety degrees out of phase with the voltages across the corresponding conductors.

The current through windings 28 and 30 on supports 20 and 22, respectively, are supplied from a common direct current source, the positive terminal of which is indicated by reference character 154. The circuit of coil 28 includes a resistor 156 and a meter 158. An appropriate mechanical linkage 160 drives a brush 162 on resistor 156 from motor 142. Similarly, the circuit of coil 30 includes a resistor 164 and a meter 166. A linkage 168 drives a brush 170 on resistor 164 from the motor 144.

Equation 1 may be rewritten as follows:

(4) $$\frac{P_V - P_S}{P_S} = \left(1 + \frac{\gamma-1}{2}\frac{V^2}{a^2}\right)^{\frac{\gamma}{\gamma-1}} - 1 = f\left(\frac{V^2}{a^2}\right)$$

In the form of our invention shown in Figure 1, the current $I_1$ through the resistance between brush 162 and ground is a measure of static pressure and the current $I_2$ through the resistance between brush 170 and ground is a measure of the difference between Pitot pressure and static pressure. That is:

(5) $$\frac{I_2}{I_1} = \frac{P_V - P_S}{P_S} = f\left(\frac{V^2}{a^2}\right)$$

In order to measure this ratio, we provide a Wheatstone bridge having resistor arms 172, 174, 176 and 178, the operative resistances of which are $R_a$, $R_b$, $R_c$ and $R_d$, respectively. Brush 180 of resistor arm 172 is driven by an appropriate linkage 182 from motor 144 so that $R_a$ is proportional to $I_2$ and brush 184 of resistor arm 174 is driven by a linkage 186 from motor 142 so that $R_b$ is proportional to $I_1$. Therefore:

(6) $$\frac{R_a}{R_b} = \frac{I_2}{I_1} = \frac{P_V - P_S}{P_S} = f\left(\frac{V^2}{a^2}\right)$$

It is to be understood that we select linear resistances for arms 172 and 174 and arrange them so that when Pitot pressure is equal to static pressure, the value of $R_a$ will be zero.

We connect a source of alternating current 187 across the bridge between the conductor connecting brush 180 and a brush 188 on resistor 176 and the conductor connecting brush 184 with one end of resistor 178. To provide a signal for balancing the bridge we connect an amplifier 190 between one end of resistor 172 and ground and complete the circuit by grounding the connection between one end of resistor 176 and resistor 178. One winding 192 of a two-phase motor, indicated generally by reference numeral 194, is connected in series with source 187. The other winding 196 of motor 194 is fed from the amplifier 190. The circuit parameters of amplifier 190 are chosen so that the voltage on winding 196 will be 90 degrees out of phase with the voltage on winding 192. When the bridge is unbalanced, a signal will be impressed on amplifier 190, amplified and fed to winding 196 of motor 194. Depending on the direction of unbalance, the armature of motor 194 will rotate to move brush 188 by appropriate linkage 198 in a direction to increase or decrease $R_c$ and balance the bridge. When the bridge is balanced:

(7) $$\frac{R_c}{R_d} = \frac{R_a}{R_b} = \frac{I_2}{I_1} = \frac{P_V - P_S}{P_S} = f\left(\frac{V^2}{a^2}\right)$$

Since the speed of sound in the circumambient atmosphere is proportional to the free air temperature, some means must be provided for obtaining a measure of this temperature. To accomplish this we employ a platinum resistor element exposed to free air temperature, the resistance of which, at a temperature $T_0$, is $$R_{T_0} = R_0[1 + 0.00392(T_0 - 273)] = (0.00392T_0 - 0.0702)R_0$$

where $R_0$ is the resistance at 0° centigrade. A fixed resistance of negligible temperature coefficient equal to $0.0702R_0$ is added in series so that the total resistance:

(8) $$R_1 = 0.00392R_0T_0$$

Since $T_0$ is the free air temperature, combining Equations 3 and 8, we see that (9) $$a^2 = \gamma R \frac{R_1}{0.00392R_0} = KR_1$$

Equation 7 may then be rewritten as

(10) $$\frac{R_c}{R_d} = \frac{R_a}{R_b} = \frac{I_2}{I_1} = \frac{P_V - P_S}{P_S} = f\left(\frac{V^2}{KR_1}\right)$$

For $R_d$ we select a fixed resistor 178 having a resistance equal to $R_1$ and from Equation 10 we find:

$$(11) \qquad R_c = R_1 f\left(\frac{V^2}{KR_1}\right)$$

At any particular temperature of the free air the value of $R_1$ will be constant and $$(12) \qquad R_c = f_1(V^2)$$

Since the ratio $$\frac{R_a}{R_b}$$

varies as a function of the ratio $$\frac{V^2}{a^2}$$

any unbalance of the bridge will result in a signal which is a function of $$\frac{V^2}{a^2}$$

across amplifier 190. In order to balance the bridge, we must vary the ratio $$\frac{R_c}{R_d}$$

as a function of $$\frac{V^2}{a^2}$$

At any particular temperature of the free air $a^2$ is a constant so that $R_c$ must be varied as some function of $V^2$ in order to balance the bridge. We employ a square law potentiometer as the resistor 176 so that if brush 188 is moved as a function of true air speed, $R_c$ will vary as a function of $V^2$. Therefore, in balancing the bridge, the armature of motor 194 will rotate as a function of true air speed to move brush 188 through linkage 198 to vary $R_c$ as a function of $V^2$. A meter 200 is also driven through appropriate linkage 202 by the armature of motor 194. Since the armature of motor 194 rotates as a function of true air speed to balance the bridge, the meter 200 can be calibrated in terms of true air speed. The resistor 173 in series with the resistance 174 is a manually adjustable resistor provided for calibrating purposes.

While we have described the construction of a true air speed meter for speeds less than Mach 1, it is to be understood that by changing the constants in accordance with relationships known to the art, our meter will operate for speeds greater than the speed of sound.

Inasmuch as the temperature of the circumambient air through which the airplane is traveling is difficult to measure, we have provided a modified system in which we measure the temperature of the air at a point where the air is brought to rest as, for example, in the opening of the Pitot tube. That is, we arrange our system so that resistor 178 measures T instead of $T_0$ and the resistance $R_1 = 0.00392 R_0 T$. We provide a bridge arrangement wherein this measurement is balanced with a measure of the ratio of the difference between Pitot pressure and static pressure with respect to static pressure so that a resultant indication of true air speed is obtained. This modified form of our invention is shown in Figure 3 wherein like reference characters indicate like parts as in the form shown in Figure 1.

It is to be noted that in this form of our invention we connect the winding 38 on the central pole of magnet 34 in series with the winding 28 by a conductor 204 so that the current $I_1$ through winding 28 always flows through coil 38, and a current $I_2'$ flows in winding 30. Magnet 34 in this case will always be an electromagnet. The force exerted by the difference between Pitot pressure and static pressure on bellows 14 will be balanced by a force $$(13) \qquad I_1 N_c . I_2' N_b = (P_v - P_s) A_p$$

or $$(14) \qquad I_2' = \frac{A_p}{N_c N_b} \cdot \frac{P_v - P_s}{I_1}$$

where $N_b$ and $N_c$ are the number of turns in windings 30 and 38, respectively, and $A_p$ is the effective area of bellows 14.

The force exerted by static pressure on bellows 12 will be balanced by a force $$(15) \qquad N_a I_1 = P_s A_s$$

or $$(16) \qquad I_1 = \frac{A_s}{N_a} P_s$$

where $N_a$ is the number of turns in winding 28 and $A_s$ is the effective area of bellows 12.

Substituting in Equation 14 for $I_1$ $$(17) \qquad I_2' = \frac{N_a A_p}{N_c N_b A_s} \cdot \frac{P_v - P_s}{P_s} = K \frac{P_v - P_s}{P_s}$$

but Mach's number $$(18) \qquad M = f\left(\frac{P_v - P_s}{P_s}\right) = \frac{V}{a}$$

and therefore, $I_2'$ is a measure of Mach's number.

Substituting a value for $T_0$ obtained from Equation 3, in Equation 2 we get $$(19) \qquad \frac{\gamma R T}{a^2} = \left(1 + \frac{\gamma - 1}{2} \cdot \frac{V^2}{a^2}\right)$$

Multiplying both sides of this expression by $$\frac{a^2}{V^2}$$

writing the right-hand side in terms of a common denominator and inverting, we find:

$$(20) \qquad \frac{V^2}{\gamma R T} = \frac{2V^2}{2a^2 + (\gamma - 1)V^2} = \frac{\frac{V^2}{a^2}}{1 + \left(\frac{\gamma-1}{2}\right)\frac{V^2}{a^2}} = \frac{M^2}{1 + \left(\frac{\gamma-1}{2}\right)M^2}$$

It will be noted that this relationship is true for all Mach number values.

The bridge of the modified form of our invention is similar to that shown in Figure 1 except that the brushes 180 and 184 of resistors 172 and 174 are both driven through a common linkage 210 from motor 144 and resistor 178 measures the temperature of air brought to rest rather than free air temperature. Since $I_2'$ is a measure of Mach number, the armature of motor 144 will rotate to move brushes 180 and 184 as a function of Mach number. Linkage 210 is so arranged that resistor 172 has a value proportional to $M^2$, and resistor 174 has a value proportional to $$1 + \left(\frac{\gamma - 1}{2}\right)M^2$$

By means of amplifier 190 feeding winding 196 of motor 194, we balance the bridge so that:

$$(21) \qquad \frac{X_1}{X_2} = \frac{X_3}{X_4} = \frac{M^2}{1 + \left(\frac{\gamma-1}{2}\right)M^2}$$

Since for any particular medium $\gamma R$ is constant and resistor 178 measures T, we see from Equations 20 and 21 that the resistance of the square law resistor 176 is proportional to $V^2$. Since resistor 176 is a square law resistor, the rotation of the armature of motor 194 is proportional to V, and meter 200, actuated by motor 194 through linkage 202, can be calibrated in terms of true air speed. It is to be noted that meter 166 in this modification is calibrated in terms of Mach's number rather than indicated air speed.

In operation, bellows 12 is responsive to the static pressure, which pressure exerts a force on the bellows 12 transmitted through the bracket 24 to support 20. This force is resisted by the electromagnetic pull of winding 28. The position of brush 162 on resistor 156 determines the current through winding 28 and, therefore, its pull, since the field of magnet 32 is maintained constant. When the electromagnetic pull exactly equals the force exerted by static pressure on the bellows, this portion of our system is balanced, and armature 48 is in its mid position so that its end 60 is symmetrically disposed with respect to the center pole winding 78 of E-transformer 62. When the parts are so disposed, equal and opposite voltages are induced in windings 92 and 94. These voltages will cancel each other so that no signal appears on the grid of tube 108, and hence no voltage is impressed on winding 138 of motor 142. Therefore, the armature of motor 142 will not rotate to displace brush 162. Meter 158, calibrated in appropriate units, will read the correct altitude value. When the static pressure changes, however, the voltage induced in one of the windings 92 or 94 is greater than that induced in the other of the two windings, and the difference voltage, impressed on the grid of tube 108, is amplified by tubes 108 and 130 and finally impressed on winding 138 of motor 142 by the transformer 134. Depending on the direction of movement of armature 48, the armature of motor 142 rotates in one direction or the other to move the brush 162 to vary the resistance of resistor 156 and thus the current through coil 28 to compensate for the change in pressure.

It should be noted particularly that we arrange our system to overcome the effect of nonlinearity in the magnetic circuits and the bellows. When a correction is initiated by displacement of the armature 48, to return the system to balance our construction readjusts the coil current so that the proper pull is exerted by the coil. Since the correction immediately affects the position of support 20, it also affects the position of armature 48, connected to the support, and therefore, the resultant signal from E-transformer 62. That is, the correction initiated by the sensing element is immediately fed back into the system so as to affect the signal produced by the sensing element itself. If the displacement of the armature due to a change in static pressure is too large, the fact that it is too large will immediately be felt by the sensing element. Since armature 48 is responsive to its own correction, it is returned to the null rapidly, and the correction is reduced asymptotically so that the sensing element will not overrun the null. If the correction is too small, the return of the element to the null will be delayed until the proper current value has been attained.

We arrange the system connected with bellows 14, which is responsive to the difference between Pitot pressure and static pressure, to operate in the same manner as the system described in connection with bellows 12. In the form of our invention shown in Figure 1, the current through coil 30 is a measure of the difference between Pitot dynamic pressure and static pressure, and since indicated air speed is a function of this difference, meter 166 can be calibrated to read indicated air speed. In the form illustrated in Figure 3 current $I_2'$ is a measure of Mach number, and meter 166 can be calibrated in Mach numbers. When armature 50 is in the null position with its end 64 asymmetrically disposed with respect to the central winding 80 of E-transformer 66, meter 166 will read the correct value of indicated air speed or Mach number. When the armature 50 is displaced by a change in the pressure difference, element 66 produces a signal which is amplified by tubes 118 and 132 and fed to winding 140 of motor 144 to cause motor 144 to move brush 170 along resistor 164 through linkage 168 in such a direction as to compensate for the change in the pressure difference. This system has its sensing element 66 arranged to operate about a null so that the effect due to nonlinearity of the bellows and magnetic circuits is minimized.

In the form of our invention shown in Figure 1, when a change in true air speed occurs, the ratio of the difference between Pitot pressure and static pressure and static pressure itself changes, and therefore, the ratio of currents $I_2$ and $I_1$ and the resistance ratio of resistors 172 and 174 change. The resultant bridge unbalance creates a signal on amplifier 190 and winding 196 of motor 194. Since resistor 178 provides a measure of free air temperature and potentiometer 176 is a square law device, the rotation of the armature of motor 194 to change the resistance of potentiometer 176 to balance the bridge is a function of true air speed. Meter 200, driven by linkage 202 from motor 194, reads true air speed. Meter 166 reads indicated air speed.

In the embodiment of our invention illustrated in Figure 3, a change in true air speed causes a change in the value of $I_2'$ and thus a change in the resistance ratio of arms 172 and 174 to unbalance the bridge. The armature of motor 194 will again move brush 188 to change the resistance of potentiometer 176 to balance the bridge. In this arrangement, the rotation of linkage 210 is a function of the Mach number, resistor 178 measures the temperature of air brought to rest, and the rotation of the armature of motor 194 is proportional to true air speed. Meter 200 again reads true air speed, and meter 166 is calibrated in Mach numbers.

It will be seen that we have accomplished the objects of our invention. We have provided a true air speed meter which will give accurate indications of the true air speed. Further, we have provided a simple means for obtaining a comparison between any two pressures. In the first embodiment of our invention, the pressures are compared directly on the bridge which balances the ratio against the ratio of a balancing arm and an arm providing a measure of the temperature of free air. In the second form of our invention, the comparison is obtained by the interaction of the magnetic fields of the currents in each of the pressure-balancing windings, and the comparison is balanced against a measurement of the temperature of air brought to rest to give an indication of true air speed. In each form we utilize the feedback principle to minimize the effect of the nonlinear characteristic of the mechanical and magnetic means employed.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A true air speed meter comprising in combination a housing having means communicating with the atmosphere, a first pressure-responsive device and a second pressure-responsive device mounted in said housing, means providing communication between the interior of said second pressure-responsive device and Pitot dynamic pressure, first and second windings carried respectively by said first and second pressure-responsive devices, a pair of magnets mounted on said housing, respective first and second windings each being disposed in the field of one of said magnets, first and second variable means for supplying currents to said first and second windings, means responsive to the displacement of each of said pressure-responsive devices to vary respective variable means to change the currents through respective first and second windings and a Wheatstone bridge having a balancing arm and a temperature-responsive arm, said bridge also including means for adjusting the impedance ratio of said balancing arm and said temperature-responsive arm with respect to an impedance ratio which varies as a function of the currents through respective first and second windings to balance said bridge and obtain an indication of true air speed.

2. A true air speed meter as in claim 1 wherein the magnet associated with said second winding is an electromagnet having a winding thereon, said electromagnet winding being connected in series with said first winding whereby the current through said second winding is proportional to the ratio of the pressures on the respective pressure-responsive devices.

3. A true air speed meter as in claim 1 in which said means responsive to the displacement of the pressure-responsive devices includes a pair of armatures pivoted on said housing and connected to respective first and second devices, and sensing means mounted on the housing adjacent each of said armatures and respectively responsive to the respective displacement of each of said armatures to vary said variable means to change the current through respective windings, said sensing means arranged to operate about nulls.

4. A true air speed meter as in claim 1 in which said means responsive to the displacement of the pressure-responsive devices includes a pair of armatures pivoted on the housing and connected to respective first and second devices, E-transformers having center windings and means for varying the relative respective positions of said E-transformers with respect to each of said armatures while maintaining the pressures within the housing and the second of said devices at predetermined points to move said armatures to positions corresponding to said predetermined pressure points.

5. A true air speed meter as in claim 1 wherein said magnets are electromagnets and means for varying the fields of said electromagnets.

6. A true air speed meter as in claim 1 wherein said means responsive to the displacement of said pressure-responsive devices includes means for producing signals characterized in accordance with the direction of displacement, and first and second reversible motors responsive to said signals for varying said variable means, at least one of said reversible motors being operatively connected to said bridge.

7. In a true air speed meter, means for obtaining a first current which is the function of the static pressure of the atmosphere in which an aircraft is flying, means for obtaining a second current which is a function of the amount the Pitot dynamic pressure exceeds said static pressure, a first impedance, a second impedance, a temperature-responsive impedance and square law impedance connected in a Wheatstone bridge, means for varrying the first impedance as a function of the first current, means for varying the second impedance as a function of the second current, and means for varying the square law impedance to bring the bridge to balance, the value of the square law impedance being a measure of the desired true air speed.

8. A true air speed meter as in claim 7 in which the means for obtaining the first current comprises means for balancing the electromagnetic pull of a winding carrying the required current against the pull of a pressure-responsive device and means for subjecting the pressure-responsive device to the static pressure of the atmosphere.

9. A true air speed meter as in claim 7 in which the means for obtaining the second current comprises means for balancing the electro-magnetic pull of a winding carrying the required current against the pull of a pressure-responsive device and means for subjecting the pressure-responsive device to the amount by which Pitot dynamic pressure exceeds static pressure.

References Cited in the file of this patent

UNITED STATES PATENTS

| 2,508,623 | Schaefer | May 23, 1950 |
| 2,574,656 | Peterson | Nov. 13, 1951 |
| 2,599,288 | Schaefer | June 3, 1952 |
| 2,602,660 | Shannon | July 8, 1952 |
| 2,620,665 | Carlisle | Dec. 9, 1952 |

FOREIGN PATENTS

| 1,012,540 | France | Apr. 16, 1952 |